Figure 1:
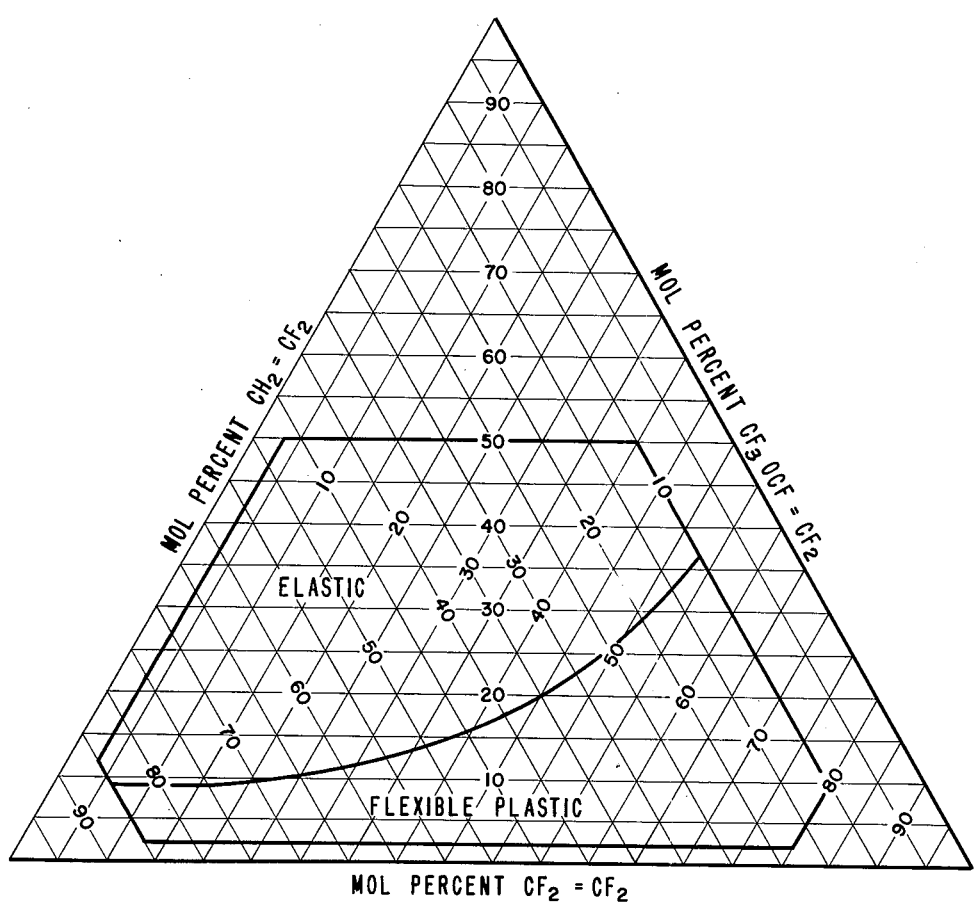

Feb. 15, 1966 J. R. ALBIN ETAL 3,235,537
FLUORINE CONTAINING TERPOLYMER OF A PERFLUOROVINYL
ETHER, VINYLIDENE FLUORIDE AND A MONOMER
OF THE STRUCTURE CFX-CFY
Filed June 23, 1961 3 Sheets-Sheet 1

ELASTIC/PLASTIC CHARACTER OF RAW COPOLYMERS

INVENTORS
JERRY RICHARD ALBIN
GEORGE ARTHUR GALLAGHER

BY *Walter H. Steinbauer Jr.*

ATTORNEY

LOW TEMPERATURE FLEXIBILITY OF CURED COPOLYMERS

INVENTORS
JERRY RICHARD ALBIN
GEORGE ARTHUR GALLAGHER

BY Walter H. Steinbauer Jr.

ATTORNEY

THERMAL STABILITY OF CURED COPOLYMERS

INVENTORS
JERRY RICHARD ALBIN
GEORGE ARTHUR GALLAGHER

ATTORNEY 3,235,537
FLUORINE CONTAINING TERPOLYMER OF A PERFLUOROVINYL ETHER, VINYLIDENE FLUORIDE AND A MONOMER OF THE STRUCTURE CFX=CFY
Jerry Richard Albin, Wilmington, Del., and George Arthur Gallagher, Media, Pa., assignors to E. I. du Pont de Nemours and Company, Wilmington, Del., a corporation of Delaware
Filed June 23, 1961, Ser. No. 119,137
12 Claims. (Cl. 260—80.5)

This invention is directed to novel fluorine-containing copolymers having outstanding properties, particularly with respect to low-temperature flexibility, high-temperature stability, and resistance to attack by solvents.

Polymeric materials derived from certain fluorinated monomers have become well known for their outstanding physical properties. However, there is still a need for polymeric materials showing significant improvement in any one of a number of properties, particularly with respect to stability at high temperatures, flexibility at low temperatures, and resistance to attack by chemicals and solvents.

It is, therefore, an object of the present invention to provide a novel class of copolymers of perfluoroalkyl perfluorovinyl ethers. It is a further object to provide copolymers containing vinylidene fluoride, which copolymers reflect improved properties.

These and other objects will become apparent in the following description and claims.

More specifically, the present invention is directed to copolymers consisting of the following monomer units:
(a) 2 to 50 mole percent of perfluoroalkyl perfluorovinyl ether units, in which units the perfluoroalkyl radical contains 1 to 3 carbon atoms

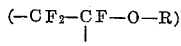

(b) 10 to 85 mole percent of vinylidene fluoride units ($-CH_2-CF_2-$); and (c) 3 to 80 mole percent of monomer units having the structural formula:

(—CFX—CFY—)

in which X and Y may be fluorine or a perfluoroalkyl radical having one to three carbon atoms, or together may form a perfluoroalkylene radical having two to five carbon atoms, and Y may additionally be chlorine.

The perfluoroalkyl perfluorovinyl ethers that may be used in the preparation of the copolymers of this invention have the general structure $R-O-CF=CF_2$ in which R is a perfluoroalkyl group having one to three carbon atoms. This includes perfluoromethyl perfluorovinyl ether, perfluoroethyl perfluorovinyl ether, and perfluoropropyl perfluorovinyl ether or mixtures of any of these. The preferred monomer is perfluoromethyl perfluorovinyl ether because the copolymers prepared from this compound in general show the most desirable properties.

These perfluoroalkyl perfluorovinyl ethers may be prepared by the pyrolysis of perfluorinated 2-alkoxypropionic acid or derivatives thereof. This acid has the following structure

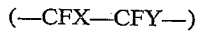

where R is a perfluoroalkyl group having one to three carbon atoms. In a preferred method, the ethers are prepared by pyrolysis of the alkali metal salt of the 2-(perfluoroalkoxy)perfluoropropionic acid at a temperature in the range of 100 to 250° C. The dry salt by itself may be pyrolyzed, in which case a temperature of 170 to 250° C. is used. The pyrolysis may also be carried out in the presence of polar or nonpolar solvents. In the presence of polar solvents, such as 1,2-dimethoxyethane and benzonitrile, the decomposition is generally carried out at temperatures of 100 to 180° C.

The 2-(perfluoroalkoxy)perfluoropropionic acids, which are starting materials for the perfluoroalkyl perfluorovinyl ethers, may be prepared in various ways. In a preferred method, it is prepared by reaction of a perfluorinated acid fluoride such as carbonyl fluoride, perfluoroacetyl fluoride, or perfluoropropionyl fluoride, with hexafluoropropylene oxide in the presence of a catalyst and in a polar solvent containing no highly active hydrogen atom. The reaction is catalyzed by alkali metal fluorides, silver fluoride, quaternary ammonium fluorides, activated carbon, etc. Examples of suitable solvents are acetonitrile, benzonitrile, dialkyl ethers of ethylene glycol or diethylene glycol, N-methyl-2-pyrrolidone, dimethyl sulfoxide, etc. The reaction is carried out at temperatures ranging from −80 to 200° C.

Representative examples of the third monomer that may be used are tetrafluoroethylene, chlorotrifluoroethylene, hexafluoropropene, perfluoro-2-butene, perfluoro-4-octene, perfluorocyclopentene, and perfluorocycloheptene. Of these, tetrafluoroethylene is the preferred monomer. Mixtures of the two or more monomers may be used.

The polymerization may be carried out in bulk or in the presence of an inert diluent such as water or a perfluorinated solvent. It is preferred to use an aqueous medium. The catalyst may be any of the conventional free-radical catalysts such as inorganic or organic peroxy compounds—for example, salts of persulfuric acid, hydrogen peroxide, benzoyl peroxide, cumene hydroperoxide—or azo compounds—for example, α,α'-azo-diisobutyonitrile—and nitrogen fluorides.

In an aqueous polymerization it is helpful to use an emulsifying agent such as water-soluble salts of long-chain perfluorocarboxylic acids, particularly if it is desired to produce the polymer in latex form. The polymerization is normally carried out under pressure at moderately elevated temperatures. The preferred pressures in an aqueous emulsion polymerization range from about 200 to 1200 p.s.i.g., although higher or lower pressures may be used. Copolymers containing more than about 50 mole percent of the perfluoroalkyl perfluorovinyl ether may be prepared by using a bulk polymerization technique and higher pressures. Lower temperatures may be used but the polymerization will proceed slower. Likewise, higher temperatures may be used with a corresponding increase in polymerization rate. The polymerization should be carried out in the absence of oxygen. Conventional methods of isolation of the polymer are used.

If desired, the molecular weight of the copolymers may be modified by the addition to the polymerization system of a chain-transfer agent such as n-hexane, carbon tetrachloride, acetone, or ethyl acetate. The amount used will depend on the molecular weight desired, on the activity of the chain-transfer agent, and the polymerization temperature. Usually not less than 0.001% and not more than 1% of the chain-transfer agent is used based on the amount of monomers used. If a very low-molecular-weight copolymer is desired, the chain-transfer-agent may be used as the polymerization medium.

The polymerization may be carried out by a batch or by a continuous process. The properties of the polymer will vary somewhat depending on the conditions and the type of process used.

The copolymers prepared in accordance with this invention may be either elastomers or flexible plastics depending on the nature and relative proportions of the monomers present in the final product. In general, they are outstanding in one or more of the following properties: thermal stability, low-temperature flexibility, mechanical strength, and resistance to attack by chemicals and solvents.

The most preferred products are those copolymers prepared from perfluoromethyl perfluorovinyl ether, vinylidene fluoride, and tetrafluoroethylene. Taking the copolymers of these three monomers as representative, the variation of properties with varying monomer compositions can best be shown by the diagrams shown in FIGURES 1, 2 and 3.

FIGURE 1 shows the relationship of composition and nature—that is, the elastic and plastic characteristics—of the raw copolymers. The division into elastomers and plastics shown in FIGURE 1 represents a gradual change and not a sharp line of demarcation. A given copolymer, particularly in the areas near the dividing line, may have the characteristics of both an elastomer and a plastic. In general, however, the division is a useful and meaningful one.

Figure 2:
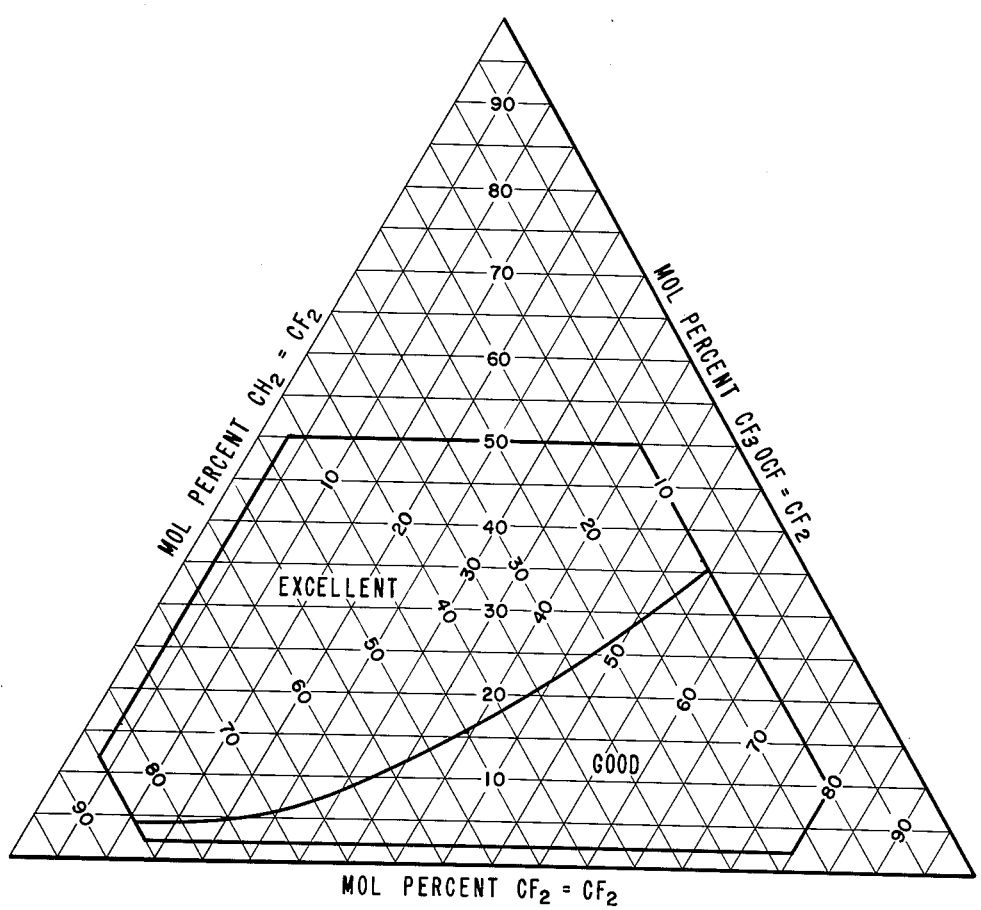

FIGURE 2 shows the effect of composition on low-temperature flexibility of the cured copolymers. It can be seen from FIGURE 2 that the copolymers of this invention vary from good to excellent in flexibility at low temperatures. Those copolymers have been considered "good" which have a stiffening point by the Clash-Berg test (ASTM D 1043–51) of no higher than 0° C. Many of the copolymers of this invention have stiffening points in the range of −25° C. to −30° C. In comparison, the commercially available fluoroelastomers prepared from vinylidene fluoride and hexafluoropropene have stiffening temperatures in the range of −18 to −12° C.

Figure 3:
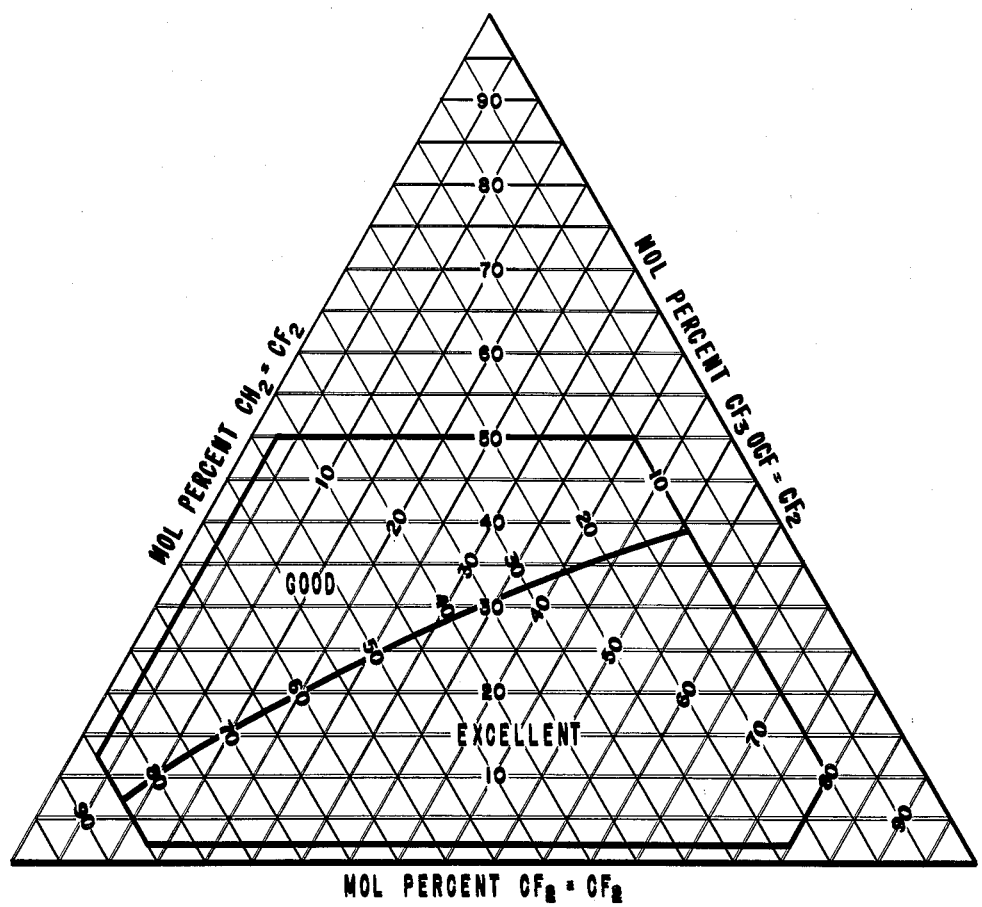

FIGURE 3 shows the effect of composition on thermal stability of the cured copolymers. It can be seen that the copolymers of this invention vary from good to excellent in this property. A copolymer is considered to show good thermal stability when it requires at least 50 hours before losing 10 percent of its weight at a temperature of 288° C. Many of the copolymers of this invention lose 10 percent of their weight only after 125–240 hours at 288° C. For comparison, commercially available fluoroelastomers prepared from vinylidene fluoride and hexafluoropropene lose 10 percent of their weight in 50 to 120 hours.

Particularly useful materials are those which correspond to the following range of molar compositions:

| | Mole percent |
|---|---|
| Vinylidene fluoride units | 70–76 |
| Tetrafluoroethylene units | 8–14 |
| Perfluoromethyl perfluorovinyl ether units | 12–19 |

Copolymers with compositions falling in this range are elastomers having an outstanding combination of thermal stability and low-temperature flexibility. Their stiffening points, as determined by the Clash-Berg test (ASTM D 1043–51) lie in the range of −26 to −29° C. which is superior to any commercially available fluorocarbon elastomer. At the same time, the copolymers of this invention falling in this composition range have thermal stability at least equivalent to the commercially available copolymers of vinylidene fluoride and hexafluoropropene.

A broader range of compositions in which the copolymers in general exhibit superior low-temperature properties and also possess good curability and good thermal stability is the following:

| | Mole percent |
|---|---|
| Vinylidene fluoride units | 60–85 |
| Tetrafluoroethylene units | 4–27 |
| Perfluoromethyl perfluorovinyl ether units | [1] 2–29 |

[1] The amount of the ether varies with the content of the other two monomers, but, in any case, must equal at least 2 mole percent.

The copolymers falling within this broader composition range possess a combination of good properties and are useful for many applications. For example, by a suitable choice of composition in this range, elastomeric materials may be obtained which have particularly good retention of mechanical strength after aging at elevated temperatures. Examples of such materials are those which contain, on a molar basis, 65 to 75 percent of vinylidene fluoride units and 16 to 25 percent of tetrafluoroethylene units, the remainder being perfluoromethyl perfluorovinyl ether units.

Copolymers of the composition below exhibit a combination of valuable properties:

| | Mole percent |
|---|---|
| Vinylidene fluoride units | 17 to 33 |
| Tetrafluoroethylene units | 42 to 64 |
| Perfluoromethyl perfluorovinyl ether units | 12 to 35 |

These materials exhibit excellent thermal stability and resistance to attack by solvents. In fact, they are substantially insoluble in common solvents such as acetone, tetrahydrofuran and N,N - dimethylformamide. This makes them particularly useful for applications in which maximum resistance to solvents is desired, such as, for example, in hydraulic hose, gaskets, and seals.

As stated previously, the copolymers prepared from perfluoromethyl perfluorovinyl ether, vinylidene fluoride and tetrafluoroethylene are the preferred copolymers of this invention. However, the other copolymers may be preferred for specific applications. It is within the scope of one skilled in the art to fit the particular composition to the specific use.

In general, lengthening the perfluoroalkyl chain of the perfluoroalkyl perfluorovinyl ether serves no useful purpose, and perfluoroalkyl groups having more than three carbon atoms are undesirable since the resulting copolymers are relatively inferior in thermal stability and are more costly.

The presence of at least 2 mole percent of the perfluoroalkyl perfluorovinyl ether units in the copolymer is required to impart a significant improvement in low-temperature properties.

The presence of the vinylidene fluoride unit is an essential feature of the copolymers of this invention. At least 10 mole percent of vinylidene fluoride units is necessary to impart a satisfactory degree of curability. This is particularly important where maximum resistance to solvents and to high-temperature deformation is desired. Copolymers containing units of another hydrogen-containing fluoro-olefin such as vinyl fluoride or trifluoroethylene, instead of the vinylidene fluoride, have inferior thermal stability. It has been found that the use of the third monomer in addition to the perfluoroalkyl perfluorovinyl ether and vinylidene fluoride unexpectedly improves the curability of the copolymers. Using techniques generally used in the curing of fluoroelastomers, the copolymers containing at least 3 mole percent of the herein defined third component yield cured materials having unexpected improvement in mechanical properties over the two-component copolymers containing only the perfluoroalkyl perfluorovinyl ether and vinylidene fluoride.

The copolymers of this invention are highly useful for a wide variety of applications. They may be used in the uncured state or they may be compounded, fabricated, and cured in the same way as known fluoroelastomers. Suitable curing agents are hexamethylenediamine carbamate, benzoyl peroxide, high energy radiation, N,N'-bis-(arylalkylidene)alkylenediamines, aliphatic and cycloaliphatic diamines, and organic dimercaptans in conjunction with aliphatic tertiary amines. An acid acceptor such as magnesium oxide or zinc oxide is used in combination with the curing agents. The copolymers may be compounded with conventional elastomer compounding agents such as carbon black, silica, and pigments, using conventional rubber compounding techniques.

The copolymers of this invention may be used in any of the applications for which the known fluoroelastomers are generally used. This includes such uses as in molded goods, such as O-rings, packings and seals; for coated fabrics to be used in fuel cells, diaphragms, and protective clothing; for hose, for wire insulation; and for protective coatings. Low-molecular-weight copolymers may be used as plasticizers for solid fluoroelastomers. Copolymers falling within the scope of this invention possess a unique combination of high-temperature stability and low-temperature flexibility which makes them particularly suitable for applications in which they will be subjected to both extremes of temperature.

Representative examples illustrating the present invention follow. The preparation and evaluation of the polymers in these examples are carried out as described below:

A. PREPARATION OF POLYMERS

Conditions used for effecting the copolymerization are as follows:

Into a 400-ml. Hastelloy C bomb are placed the desired amounts of ammonium persulfate, ammonium perfluorocaprylate, and deoxygenated distilled water while maintaining the whole operation under a blanket of nitrogen. After closing the bomb and freezing for 10–15 minutes in a "Dry Ice"-acetone bath (about −78° C.) it is evacuated to a pressure of less than 1 mm. Hg.

The desired monomers, preweighed into loading cylinders, are then added to the evacuated, cold bomb in order of their boiling points, starting with the highest boiling material.

The loaded bomb is then placed in a shaker unit and heated to 60° C. while shaking in a reciprocal motion at 180 cycles per minute. Heating and shaking is continued for two hours after the last observable pressure drop and is then discontinued.

After cooling to room temperature, any small amount of residual gas is recovered by attaching an evacuated cylinder, cooled to about −78° C., to the bomb. The contents of the bomb are then removed.

The bomb contents, usually in the form of an emulsion, are placed in a stainless steel beaker which is partially immersed in a "Dry Ice"-acetone bath until the contents are frozen solid. Upon warming the beaker and contents to room temperature, the copolymer is obtained as a coagulum.

The aqueous material is removed by filtration to remove the bulk of initiator and emulsifier residues. The coagulum is then washed with 200-ml. portions of distilled water using an Osterizer Blendor until two successive washes are acid free. The wet coagulum is dried in a vacuum oven at 70° C.

The inherent viscosity of the polymer is measured at 30° C. using 0.1 gram of polymer dissolved in 100 ml. of a mixture containing 87 parts of tetrahydrofuran and 13 parts of N,N-dimethylformamide.

B. POLYMER EVALUATIONS (1) *Raw film.*—The films are made by compressing one to two grams of the dry raw copolymer between two aluminum sheets for one to two minutes at 150° C. and a pressure of 2,000 pounds per square inch.

(2) *Vulcanized strips.*—Ten grams of the raw copolymer is worked on a 2″ x 6″ two-roll rubber mill, and the compounding ingredients are milled in using conventional rubber-compounding techniques. The recipe used is:

| | Parts by weight |
|---|---|
| Copolymer | 100 |
| Magnesium oxide | 15 |
| Medium thermal carbon black | 20 |
| Hexamethylenediamine carbamate | As indicated |

The compounded strips are placed in a standard 1″ x 5″ x 0.075″ cavity mold and heated at 150° C. for 0.5 to 1 hour while maintaining the mold under a pressure of 1,000–4,000 pounds per square inch. The time of the press cure is indicated in the examples. The mold is then cooled under pressure by passing cold water through the press platens, and the molded slab is removed. The cure is completed by placing the slabs in an oven, heating from 25° C. to 204° C. over a period of 2 hours and then heating at 204° C. for 18 to 24 hours. Strips of one-quarter-inch width are cut from the slabs for testing.

(2) The copolymers are tested as follows:

(a) Stress-strain properties are obtained by pulling a strip on an Instron tester at a rate of 10 inches per minute at 25° C.

To determine resistance to thermal degradation, strips one-quarter-inch in width are hung for 48 hours in a circulating air oven heated to 288° C. The strips are then cooled to room temperature and the stress-strain properties obtained as described above. Also the length of time required for samples of both the raw and the cured polymer to lose 10 percent of their original weight when submitted to a temperature of 288° C. is observed.

(b) Low-temperature properties are obtained qualitatively by placing the raw film or a bent loop of the vulcanizate (made by joining the ends of a strip of dimension 0.075 x 5 x 0.25 inches) in a freezer maintained at −26° C. for 24 hours and observing the degree of rigidity. Quantitative measurements are made by the Clash-Berg test (ASTM D 1043–51), results of which are expressed in the temperature, ° C., at which the modulus of the sample, on gradual cooling, reaches 6,000 p.s.i. (stiffening point).

Example 1

Using the general procedure heretofore described in paragraph A, 300 ml. of water, 0.80 gram of ammonium persulfate, and 0.14 gram of ammonium perfluorocaprylate are charged to the bomb. The monomers charged are 20.2 grams of vinylidene fluoride, 2.9 grams of tetrafluoroethylene, and 6.1 grams of perfluoromethyl perfluorovinyl ether, a weight ratio of monomers of 69/10/21, representing a molar ratio of 82/8/10. The time between the start of the reaction and the last observed pressure drop is 0.75 hour. The maximum pressure attained is 490 p.s.i.g. and the pressure drop is 490 p.s.i.g. There is 0.4 gram of off-gas, representing 1.4 percent of the total monomer charge. The product weighs 24 grams and is an elastic plastic. It has an inherent viscosity of 0.65. Analysis shows the following:

| | Found | Theory (based on monomers charged) |
|---|---|---|
| Percent C | 32.1 | 32.9 |

The raw film requires 180 hours to lose 10 percent of its weight when submitted to a temperature of 288° C. It is fairly flexible at −26° C.

The copolymer is compounded and cured as heretofore described in paragraph B using 1.5 parts of hexamethylenediamine carbamate. It is press-cured for 30 minutes. The tensile properties of the cured polymer are:

| | Original | After heat aging |
|---|---|---|
| Tensile strength at the break, p.s.i. | 1,630 | 2,460 |
| Elongation at the break, percent | 140 | 220 |
| Modulus at 100% elongation, p.s.i. | 1,390 | 1,290 |

Example 2

Using the general procedure heretofore described in paragraph A, 350 ml. of water, 0.40 gram of ammonium persulfate and 0.14 gram of ammonium perfluorocaprylate are charged to the bomb. The monomers charged are 7.6 grams of vinylidene fluoride, 2.1 grams of tetrafluoroethylene, and 3.6 grams of perfluoromethyl perfluorovinyl ether, representing a weight ratio of 57/16/27 and a molar ratio of 73/13/14. Time between start of reaction and last observed pressure drop is 0.75 hour.

The maximum pressure attained is 300 p.s.i.g. and the pressure drop is 300 p.s.i.g. There is 0.3 gram of off-gas, representing 2.3 percent of the total charge. The product weighs 11.1 grams. The product is an elastomer having an inherent viscosity of 1.2. Analysis shows the following:

| | Found | Theory (based on monomers charged) |
|---|---|---|
| Percent C | 30.7 | 31.1 |

The raw film requires 240 hours to lose 10 percent of its weight when subjected to a temperature of 288° C. It is flexible at −26° C.

The copolymer is compounded and cured as heretofore described in paragraph B using 1.5 parts of hexamethylenediamine carbamate. It is press-cured for 30 minutes. The tensile properties of the cured polymer are:

| | Original | After heat aging |
|---|---|---|
| Tensile strength at the break, p.s.i. | 2,000 | 1,120 |
| Elongation at the break, percent | 440 | 560 |
| Modulus at 200% elongation, p.s.i. | 880 | 580 |

It requires 125 hours for the cured polymer to lose 10 percent of its weight when subjected to a temperature of 288° C. The stiffening point in the Clash-Berg test is −27° C.

*Example 3*

Using the general procedure heretofore described in paragraph A, 350 ml. of water, 0.53 gram of ammonium persulfate, and 0.14 gram of ammonium perfluorocaprylate are charged to the bomb. The monomers charged are 3.9 grams of vinylidene fluoride, 6.8 grams of tetrafluoroethylene, and 9.5 grams of perfluoromethyl perfluorovinyl ether, a weight ratio of monomers of 19/34/47, and a molar ratio of 33/36/31. The time between the start of the reaction and the last observed pressure drop is 6.5 hours. The maximum pressure attained is 250 p.s.i.g. and the pressure drop is 250 p.s.i.g. There is no off-gas. The product weighs 13.8 grams and is a slightly plastic elastic which is flexible at −26° C. and requires 155 hours to lose 10 percent of its weight when submitted to a temperature of 288° C.

Analysis shows the following:

| | Found | Theory (based on monomers charged) |
|---|---|---|
| Percent C | 25.9 | 25.5 |

The coplymer is compounded and cured as heretofore described in paragraph B using 2 parts of hexamethylenediamine carbamate. It is press-cured for 60 minutes. At 288° C. it requires 145 hours for the cured polymer to lose 10 percent of its weight. The stiffening point in the Clash-Berg test is −14° C.

*Example 4*

Using the general procedure heretofore described in paragraph A, 350 ml. of water, 0.53 gram of ammonium persulfate, and 0.14 gram of ammonium perfluorocaprylate are charged to the bomb. The monomers charged are 3.2 grams of vinylidene fluoride, 4.3 grams of tetrafluoroethylene, and 13.2 grams of perfluoromethyl perfluorovinyl ether, a weight ratio of monomers of 15/21/64, and a molar ratio of 29/25/46. The time between the start of the reaction and the last observed pressure drop is 9 hours. The maximum pressure attained is 245 p.s.i.g. and the pressure drop is 245 p.s.i.g. There is 2.0 grams of off-gas, representing 10 percent of the total charge. The product weighs 13.8 grams. It is a slightly plastic elastic.

Analysis shows the following:

| | Found | Theory (based on monomers charged) |
|---|---|---|
| Percent C | 25.3 | 24.6 |

The raw copolymer is flexible at −26° C. and at 288° C. requires 31 hours to lose 10 percent of its weight. The copolymer is compounded as heretofore described in paragraph B using 2 parts of hexamethylenediamine carbamate and is press-cured for 60 minutes. The cured copolymer requires 70 hours at 288° C. to lose 10 percent of its weight. The stiffening point by the Clash-Berg test is −17° C.

*Example 5*

Using the general procedures heretofore described in paragraph A, 300 ml. of water, 0.80 gram of ammonium persulfate, and 0.14 gram of ammonium perfluorocaprylate are charged to the bomb. The monomers charged are:

| | Gram | Weight ratio | Molar ratio |
|---|---|---|---|
| Vinylidene fluoride | 15.2 | 51 | 68 |
| Tetrafluoroethylene | 5.8 | 19 | 17 |
| Perfluoromethyl perfluorovinyl ether | 8.8 | 30 | 15 |

The time elapsed between the start of the reaction and the last observed pressure drop is 2.25 hours. The maximum pressure attained is 450 p.s.i.g. and the pressure drop is 450 p.s.i.g. There is no off-gas. The product weighs 25 grams and is an elastomer having an inherent viscosity of 1.2. The raw film is flexible at −26° C. and requires 143 hours at 288° C. to lose 10 percent of its weight. Analysis shows the following:

| | Found | Theory (based on monomers charged) |
|---|---|---|
| Percent C | 30.4 | 31.4 |

The copolymer is compounded and cured as heretofore described in paragraph B using 1.5 parts of hexamethylenediamine carbamate. It is press-cured for 30 minutes. The tensile properties of the cured copolymer are:

| | Original | After heat aging |
|---|---|---|
| Tensile strength at the break, p.s.i. | 1,690 | 1,630 |
| Elongation at the break, percent | 320 | 340 |
| Modulus at 200% elongation, p.s.i. | 1,020 | 1,000 |

The stiffening point in the Clash-Berg test is −20° C.

*Example 6*

Using the general procedure heretofore described in paragraph A, 300 ml. of water, 0.8 gram of ammonium persulfate, and 0.14 gram of ammonium perfluorocaprylate are charged to the bomb. The monomers charged are 17.8 grams of vinylidene fluoride, 4.8 grams of chlorotrifluoroethylene, and 8.6 grams of perfluoromethyl perfluorovinyl ether, a weight ratio of 57/15/28 and a molar ratio of 75/10/15. The time between the start of the reaction and the last observed pressure drop is 1.25 hours. The maximum pressure attained is 455 p.s.i.g. and the pressure drop is 455 p.s.i.g. There are no off-gases. The product weighs 27.4 grams and is a rubbery polymer which is flexible at −26° C.

The copolymer is compounded and cured as heretofore described in paragraph B using 1.5 parts of hexamethylenediamine carbamate. It is press-cured for 30 minutes. The tensile properties of the cured copolymer are:

|  | Original | After heat aging |
|---|---|---|
| Tensile strength at the break, p.s.i. | 660 | 390 |
| Elongation at break, percent | 630 | 105 |
| Modulus at 100% elongation, p.s.i. | 195 | 390 |

The stiffening point in the Clash-Berg test is −27° C.

Example 7

Using the general procedure heretofore described in paragraph A, 350 ml. of water, 0.53 gram of ammonium persulfate, and 0.14 gram of ammonium perfluorocaprylate are charged to the bomb. The monomers charged are 14.3 grams of vinylidene fluoride, 3.4 grams of hexafluoropropene, and 2.4 grams of perfluoromethyl perfluorovinyl ether, a weight ratio of 71/17/12 and a mole ratio of 85/9/6. The time between the start of the reaction and the last observed pressure drop is 0.75 hour. The maximum pressure attained is 250 p.s.i.g. and the pressure drop is 250 p.s.i.g. There are no off-gases. The product weighs 18.2 grams and is an elastic plastic. It has an inherent viscosity of 0.71.

Analysis shows the following:

|  | Found | Theory (based on monomers charged) |
|---|---|---|
| Percent C | 33.4 | 33.3 |

The polymer is compounded and cured as heretofore described in paragraph B using 1.5 parts of hexamethylenediamine carbamate. It is press-cured for 30 minutes. The tensile properties of the cured polymer are:

Tensile strength at the break, p.s.i. _____ 2450
Elongation at the break, percent _____ 300
Modulus at 100% elongation, p.s.i. _____ 950

The raw polymer requires 60 hours at 288° C. to lose 10 percent of its weight, and the cured polymer requires 77 hours. The raw polymer is fairly flexible at −26° C.

Example 8

Using the general procedure heretofore described under paragraph A, 250 ml. of water, 0.53 gram of ammonium persulfate, and 0.14 gram of ammonium perfluorocaprylate are charged to the bomb. The monomers charged are 9.9 grams of vinylidene fluoride, 4.6 grams of tetrafluoroethylene, and 8.1 grams of perfluoropropyl perfluorovinyl ether, a weight ratio of 44/20/36, and a molar ratio of 67/20/13. The time between the start of the reaction and the last observed pressure drop is one hour. The maximum pressure attained is 210 p.s.i.g. and the pressure drop is 210 p.s.i.g. There are no off-gases. The product weighs 20 grams and is a rubbery polymer which has an inherent viscosity of 0.61. It forms a film which is flexible at −26° C.

Analysis shows the following:

|  | Found | Theory (based on monomers charged) |
|---|---|---|
| Percent C | 29.1 | 29.1 |

The polymer is compounded and cured as heretofore described in paragraph B using 2 parts of hexamethylenediamine carbamate. It is press-cured for 30 minutes. The cured polymer requires 77 hours at 288° C. to lose 10 percent of its weight. It is flexible at −27° C.

Example 9

Using the general procedure heretofore described under paragraph A, 250 ml. of water, 0.53 gram of ammonium persulfate, and 0.14 gram of ammonium perfluorocaprylate are charged to the bomb. The monomers charged are 7.9 grams of vinylidene fluoride, 5.1 grams of hexafluoropropene, and 6.2 grams of perfluoropropyl perfluorovinyl ether, a weight ratio of 41/27/32, and a molar ratio of 68/19/13. The time between the start of the reaction and the last observed pressure drop is 2.25 hours. The maximum pressure attained is 205 p.s.i.g. and the pressure drop is 205 p.s.i.g. There is 0.2 gram of off-gas, representing 1 percent of the total charge. The product weighs 15.2 grams and is a plastic. It has an inherent viscosity of 0.32.

Analysis shows the following:

|  | Found | Theory (based on monomers charged) |
|---|---|---|
| Percent C | 29.2 | 28.8 |

The raw polymer film requires 115 hours at 288° C. to lose 10 percent of its weight and is slightly flexible at −26° C. The polymer is compounded and cured as heretofore described in paragraph B using 1.5 parts of hexamethylenediamine carbamate. It is press-cured for 30 minutes. The cured film requires 88 hours to lose 10 percent of its weight. It is slightly flexible at −26° C.

Example 10

Using the general procedure heretofore described in paragraph A, 250 ml. of water, 0.53 gram of ammonium persulfate, and 0.14 gram of ammonium perfluorocaprylate are charged to the bomb. The monomers charged are 11.7 grams of vinylidene fluoride, 3.0 grams of perfluoro-2-butene, and 6.0 grams of perfluoromethyl perfluorovinyl ether, giving a weight ratio of 57/14/29, and a molar ratio of 78/6/16. The time between the start of the reaction and the last observed pressure drop is 0.75 hour. The maximum pressure attained is 275 p.s.i.g. and the pressure drop is 275 p.s.i.g. The product weighs 18.1 grams and is a rubbery polymer having an inherent viscosity of 1.21.

Example 11

Using the general procedure heretofore described in paragraph A, 250 ml. of water, 0.53 gram of ammonium persulfate and 0.14 gram of ammonium perfluorocaprylate are charged to the bomb. The monomers charged are 11.6 grams of vinylidene fluoride, 3.2 grams of perfluorocyclobutene, and 5.6 grams of perfluoromethyl perfluorovinyl ether, giving a weight ratio of 57/16/27 and a molar ratio of 77/9/14. The interval between the start of the reaction and the last observed pressure drop is 0.75 hour. The maximum pressure attained is 275 p.s.i.g. and the pressure drop is 275 p.s.i.g. The product weighs 17.0 grams and is a rubbery polymer having an inherent viscosity of 1.02.

Example 12

Using the general procedure heretofore described in paragraph A, 350 ml. of water, 0.53 gram of ammonium persulfate, and 0.14 gram of ammonium perfluorocaprylate are charged to the bomb. The monomers charged are 3.5 grams of vinylidene fluoride, 9.5 grams of tetrafluoroethylene, and 8.4 grams of perfluoromethyl perfluorovinyl ether, a weight ratio of monomers of 16/45/39, representing a molar ratio of 27/48/25. The time elapsed between the start of the reaction and the last observed pressure drop is 3 hours. The maximum pressure attained is 300 p.s.i.g. and the pressure drop is 300 p.s.i.g. There is 0.6 gram of off-gas representing 2.8 percent of the total charge. The product weighs 18.6 grams and is an elastic plastic. It is insoluble in acetone. Analysis shows the following:

|  | Found | Theory (based on monomers charged) |
|---|---|---|
| Percent C | 25.1 | 25.0 |

The copolymer is compounded and cured as heretofore described in paragraph B using 2.0 parts of hexamethylenediamine carbamate. It is press-cured for 60 minutes. The tensile properties of the cured copolymer are:

|  | Original | After heat aging |
|---|---|---|
| Tensile strength at the break, p.s.i. | 1,720 | 1,220 |
| Elongation at break, percent | 290 | 330 |
| Modulus at 200% elongation, p.s.i. | 1,260 | 840 |

It requires 235 hours for the cured polymer to lose 10 percent of its weight when subjected to a temperature of 288° C. The stiffening point in the Clash-Berg test is —6° C.

*Example 13*

Using the general procedure heretofore described in paragraph A, 250 ml. of water, 0.80 gram of ammonium persulfate, and 0.14 gram of ammonium perfluorocaprylate are charged to the bomb. The monomers charged are 19.0 grams of vinylidene fluoride, 8.9 grams of tetrafluoroethylene and 3.2 grams of perfluoromethyl perfluorovinyl ether, a weight ratio of monomers of 61/29/10, representing a molar ratio of 73/22/5. The time elapsed between the start of the reaction and the last observed pressure drop is about 45 minutes. The maximum pressure attained is 450 p.s.i.g. and the pressure drop is 450 p.s.i.g. There is no off-gas. The product weighs 29.0 grams and is a slightly elastic plastic having an inherent viscosity of 1.19. Analysis shows the following:

|  | Found | Theory (based on monomers charged) |
|---|---|---|
| Percent C | 31.8 | 32.0 |

The copolymer is compounded and cured as heretofore described in paragraph B using 1.5 parts of hexamethylenediamine carbamate. It is press-cured for 30 minutes. The tensile properties of the cured copolymer are:

|  | Original | After heat aging |
|---|---|---|
| Tensile strength at the break, p.s.i. | 3,190 | 3,640 |
| Elongation at break, percent | 270 | 300 |
| Modulus at 200% elongation, p.s.i. | 2,450 | 2,450 |

*Example 14*

Using the general procedure heretofore described in paragraph A, 250 ml. of water, 0.70 gram of ammonium persulfate, 0.50 gram of ammonium perfluorocaprylate, and 0.04 ml. of n-heptane are charged to the bomb. The monomers charged are 11.2 grams of vinylidene fluoride, 2.6 grams of tetrafluoroethylene, and 6.3 grams of perfluoromethyl perfluorovinyl ether, giving a weight ratio of 56/13/31 and a molar ratio of 73/11/16.

The tube is heated at 60° C. for 2.25 hours, during which time the pressure drops from 300 to 0 p.s.i.g. Heating is then continued for an additional 1.5 hours.

The polymer, isolated as heretofore described in paragraph A, weighs 19.3 grams (96 percent conversion based on the monomers charged). It is quite mobile at 70° C. and has a putty-like consistency at 25° C. It has an inherent viscosity of 0.44.

Analysis shows the following:

|  | Found | Theory (based on monomers charged) |
|---|---|---|
| Percent C | 30.4 | 30.8 |

*Example 15.—Preparation of 2-(perfluoromethoxy) perfluoropropionyl fluoride*

30 grams of cesium fluoride and 75 ml. of diethyleneglycol dimethyl ether are charged to a 320-ml. stainless steel autoclave, and the vessel is cooled to —80° C. After evacuating the vessel, 66 grams of carbonyl fluoride and 83 grams of hexafluoropropylene oxide are charged to the autoclave and the vessel is heated to 75° C. for 4 hours. Distillation of the resulting product affords 82 grams of 2 - (perfluoromethoxy)perfluoropropionyl fluoride, B.P. 10–12° C.

The corresponding 2-(perfluoroethoxy)- and 2-(perfluoropropoxy)-perfluoropropionyl fluorides are prepared in a similar fashion except that perfluoroacetyl fluoride and perfluoropropionyl fluoride, respectively, are used instead of carbonyl fluoride.

*Example 16.—Preparation of perfluoromethyl perfluorovinyl ether*

A reaction vessel consisting of a polyethylene bottle with a "Dry Ice" condenser attached, is charged with 201 grams of 2-(perfluoromethoxy)perfluoropropionyl fluoride. There is then added 30 grams of water. The reaction mixture is neutralized to a phenolphthalein end point with 10 N potassium hydroxide in water and is then evaporated to dryness at 25° C. The dry mixture of the potassium salt of the acid and potassium fluoride is further dried in a vacuum at 100° C. The salt mixture is charged to a glass reaction vessel attached to a trap cooled by "Dry Ice." The vessel is heated to 185–215° C. for 24 hours. Distillation of the condensate collected in the trap affords 115 grams of perfluoromethyl perfluorovinyl ether.

The preceding examples are representative and may be varied within the scope of the total specification disclosure to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Normally-solid, curable copolymers consisting of the following monomer units: (a) from 2 to 50 mole percent of perfluoroalkyl perfluorovinyl ether units, in which units the perfluoroalkyl radical contains 1 to 3 carbon atoms

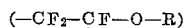

(b) from 10 to 85 mole percent of vinylidene fluoride units (—CH$_2$—CF$_2$—); and (c) from 3 to 80 mole percent of units having the structural formula: (—CFX—CFY—) in which units X and Y are selected from the group consisting of fluorine, and a perfluoroalkyl radical having one to three carbon atoms; X and Y together may form a perfluoroalkylene radical having two to five carbon atoms, and Y may be chlorine.

2. A normally-solid, curable copolymer consisting of the following monomer units: (a) from 2 to 50 mole percent perfluoromethyl perfluorovinyl ether units; (b) from 10 to 85 mole percent of vinylidene fluoride units; and (c) from 3 to 80 mole percent of tetrafluoroethylene units.

3. A normally-solid cured polymer consisting of the following monomer units: (a) from 2 to 50 mole percent of perfluoroalkyl perfluorovinyl ether units, in which units the perfluoroalkyl radical contains 1 to 3 carbon atoms $$(-CF_2-CF-O-R)$$

(b) from 10 to 85 mole percent of vinylidene fluoride units ($-CH_2-CF_2-$); and (c) from 3 to 80 mole percent of units having the structural formula: ($-CFX-CFY-$) in which units X and Y are selected from the group consisting of fluorine, and a perfluoroalkyl radical having one to three carbon atoms; X and Y together may form a perfluoroalkylene radical having two to five carbon atoms, and Y may be chlorine.

4. Normally-solid, curable copolymers consisting of the following monomer units: (a) from 12 to 19 mole percent of perfluoroalkyl perfluorovinyl ether units, in which units the perfluoroalkyl radical contains from 1 to 3 carbon atoms $$(-CF_2-CF-O-R)$$

(b) from 70 to 76 mole percent vinylidene fluoride units ($-CH_2-CF_2-$); and (c) from 8 to 14 mole percent of tetrafluoroethylene units ($-CF_2-CF_2-$).

5. A copolymer as defined in claim 4 wherein the perfluoroalkyl group of (a) is perfluoromethyl.

6. A normally-solid, cured copolymer consisting of the following monomer units: (a) from 12 to 19 mole percent of perfluoroalkyl perfluorovinyl ether units, in which units the perfluoroalkyl radical contains from 1 to 3 carbon atoms $$(-CF_2-CF-O-R)$$

(b) from 70 to 76 mole percent vinylidene fluoride units ($-CH_2-CF_2-$); and (c) from 8 to 14 mole percent of tetrafluoroethylene units ($-CF_2-CF_2-$).

7. Normally-solid, curable copolymers consisting of the following monomer units: (a) from 12 to 35 mole percent of perfluoroalkyl perfluorovinyl ether units, in which units the perfluoroalkyl radical contains from 1 to 3 carbon atoms $$(-CF_2-CF-O-R)$$

(b) from 17 to 33 mole percent vinylidene fluoride units ($-CH_2-CF_2-$); and (c) from 42 to 64 mole percent of tetrafluoroethylene units ($-CF_2-CF_2-$).

8. A copolymer as defined in claim 7 wherein the perfluoroalkyl group of (a) is perfluoromethyl.

9. A normally-solid, cured copolymer consisting of the following monomer units: (a) from 12 to 35 mole percent of perfluoroalkyl perfluorovinyl ether units, in which units the perfluoroalkyl radical contains from 1 to 3 carbon atoms $$(-CF_2-CF-O-R)$$

(b) from 17 to 33 mole percent vinylidene fluoride units ($-CH_2-CF_2-$); and (c) from 42 to 64 mole percent of tetrafluoroethylene units ($-CF_2-CF_2-$).

10. A copolymer as defined in claim 1 wherein the perfluoroalkyl group of (a) is perfluoropropyl.

11. A copolymer as defined in claim 1 wherein the units (c) are chlorotrifluoroethylene units $$(-CFCl-CF_2-)$$

12. A copolymer as defined in claim 1 wherein the units (c) are hexafluoropropene units $$(-CF_2-CF-CF_3)$$

References Cited by the Examiner

UNITED STATES PATENTS

| | | | |
|---|---|---|---|
| 2,856,435 | 10/1958 | Lo | 260—80.5 |
| 2,917,548 | 12/1959 | Dixon | 260—614 |
| 3,023,187 | 2/1962 | Lo | 260—80.5 |
| 3,132,123 | 5/1964 | Harris et al. | 260—87.5 |

JOSEPH L. SCHOFER, *Primary Examiner.*